US010336307B2

(12) United States Patent
Parnapy et al.

(10) Patent No.: US 10,336,307 B2
(45) Date of Patent: Jul. 2, 2019

(54) ELECTRONICALLY CONTROLLED PNEUMATIC (ECP) OVERLAY CONTROL VALVE

(71) Applicant: NEW YORK AIR BRAKE, LLC, Watertown, NY (US)

(72) Inventors: Keith Parnapy, North Bangor, NY (US); Derick Call, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 172 days.

(21) Appl. No.: 15/272,464

(22) Filed: Sep. 22, 2016

(65) Prior Publication Data
US 2018/0079401 A1    Mar. 22, 2018

(51) Int. Cl.
| | |
|---|---|
| B60T 13/68 | (2006.01) |
| B60T 15/18 | (2006.01) |
| B60T 15/02 | (2006.01) |
| B60T 15/24 | (2006.01) |
| B60T 17/22 | (2006.01) |

(52) U.S. Cl.
CPC .......... *B60T 15/184* (2013.01); *B60T 13/683* (2013.01); *B60T 15/021* (2013.01); *B60T 15/027* (2013.01); *B60T 15/24* (2013.01); *B60T 17/228* (2013.01)

(58) Field of Classification Search
CPC .... B60T 13/683; B60T 11/326; B60T 15/021; B60T 15/048; B60T 15/36; B60T 17/04; B60T 8/268
USPC ........................................................ 303/128
See application file for complete search history.

(56) References Cited

U.S. PATENT DOCUMENTS

| | | | | |
|---|---|---|---|---|
| 2,136,582 A | * | 11/1938 | Campbell ............. | B60T 15/048 303/24.1 |
| 2,147,295 A | * | 2/1939 | Hewitt .................. | B60T 15/048 303/15 |
| 2,173,940 A | * | 9/1939 | Hewitt .................. | B60T 15/048 303/15 |
| 2,177,527 A | * | 10/1939 | Hewitt .................... | B60T 8/285 303/15 |

(Continued)

FOREIGN PATENT DOCUMENTS

| | | |
|---|---|---|
| EP | 1847432 A2 | 10/2007 |
| WO | 9809857 A1 | 3/1998 |

OTHER PUBLICATIONS

International Search Report and Written Opinion Form PCT/ISA/220, International Application No. PCT/US2016/052976, pp. 1-12, International Filing Date Sep. 22, 2016, search report dated Jun. 23, 2016.

*Primary Examiner* — Bradley T King
*Assistant Examiner* — Mahbubur Rashid
(74) *Attorney, Agent, or Firm* — Bond Schoeneck and King PLLC; David Nocilly

(57) ABSTRACT

An electronically controlled pneumatic (ECP) overlay control valve can selective switch between a conventional pneumatic mode and an ECP mode. In ECP mode, the overlay control valve shunts the brake cylinder pressure of the pneumatic control valve which allows a relay valve to build or exhaust pressure in the brake cylinder in response to an electronically controlled apply/release circuit. In conventional pneumatic mode, the overlay control valve disconnects the relay valve and allows a conventional pneumatic control valve to control the pressurization and exhausting of the brake cylinder.

8 Claims, 2 Drawing Sheets

(56) References Cited

U.S. PATENT DOCUMENTS

Figure 1:
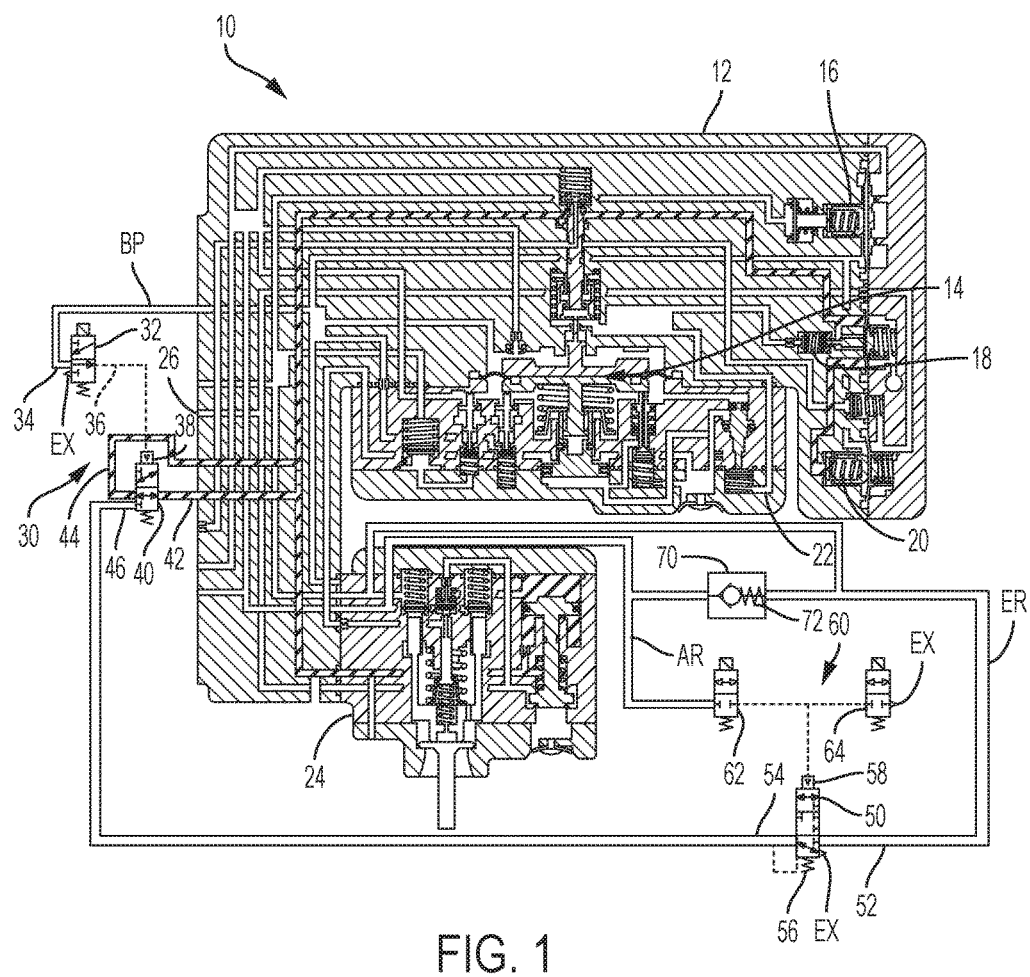

| | | | | |
|---|---|---|---|---|
| 2,208,771 | A * | 7/1940 | McKinstry | B60T 15/048 303/15 |
| 2,637,602 | A * | 5/1953 | Eisenberg | B60T 13/266 303/40 |
| 2,697,012 | A * | 12/1954 | Cook | B60T 15/048 303/26 |
| 4,436,347 | A * | 3/1984 | Stumpe | B60T 13/263 303/15 |
| 4,586,755 | A * | 5/1986 | Worbois | B60T 15/36 303/13 |
| 5,758,929 | A * | 6/1998 | Newton | B60T 13/665 303/28 |
| 5,986,544 | A * | 11/1999 | Kaisers | B60T 8/00 280/504 |
| 6,079,790 | A * | 6/2000 | Broome | B60T 8/00 137/625.64 |
| 6,472,769 | B1 * | 10/2002 | Long, Jr. | B60T 13/665 303/15 |
| 2002/0163248 | A1 * | 11/2002 | Wood | B60T 8/1881 303/128 |
| 2002/0167220 | A1 * | 11/2002 | Cunkelman | B60T 11/326 303/128 |
| 2002/0180264 | A1 * | 12/2002 | Moffitt | B60T 13/665 303/128 |
| 2006/0138856 | A1 * | 6/2006 | McLaughlin | B60T 13/683 303/3 |
| 2008/0030068 | A1 * | 2/2008 | Bensch | B60T 7/20 303/17 |
| 2010/0072809 | A1 * | 3/2010 | Newton | B60T 13/665 303/7 |
| 2010/0072810 | A1 * | 3/2010 | Bensch | B60T 8/362 303/17 |
| 2010/0187902 | A1 * | 7/2010 | Bensch | B60T 13/261 303/127 |
| 2010/0256842 | A1 * | 10/2010 | Liberatore | B60T 13/665 701/19 |
| 2013/0320751 | A1 * | 12/2013 | Eberling | B60T 7/042 303/14 |
| 2014/0103237 | A1 * | 4/2014 | Herges | B60T 7/20 251/129.01 |

* cited by examiner

ELECTRONICALLY CONTROLLED PNEUMATIC (ECP) OVERLAY CONTROL VALVE

BACKGROUND OF THE INVENTION

1. Field of the Invention

The present invention relates to electronically controlled pneumatic braking systems and, more particularly, to an overlay control valve that can fit within the existing control valve envelope.

2. Description of the Related Art

Electronically controlled pneumatic (ECP) brake systems involve the use of electronic controls to activate the pneumatically powered brakes of railcars. A typical implementation of an ECP system includes the addition of electronics and electronically controlled hardware to an existing pneumatic braking system so that the electronic system "overlays" the strictly pneumatic components. In such an overlay, a freight car can operate in either a conventional mode or an ECP mode. As a result, a car can be hauled in a train operating with conventional brakes or in train equipped with ECP brakes. One problem associated with this approach, however, is that a separate car control device must be provided externally to the existing pneumatic system and then piped into the existing pneumatic control valve via a dedicated interface plate. This conventional approach thus requires the additional infrastructure and costs of installing and maintaining two stand-alone systems. Accordingly, there is a need in the art for an ECP overlay control valve that simplifies the structure required to provide both conventional and ECP control over a railcar braking system.

BRIEF SUMMARY OF THE INVENTION

The present invention provides a simplified ECP overlay system for a pneumatic control valve having a brake cylinder pressure outlet by including a relay valve having a first port coupled to a source of reservoir pressure, a second port for providing a brake cylinder pressure output, and an exhaust, wherein the relay valve is movable between a first position where the second port is connected to the exhaust, a second position where the first port, the second port, and the exhaust are isolated from each other, and a third position where the first port is connected to the second port so that the source of reservoir pressure provides the brake cylinder pressure output. A pilot valve is coupled to the relay valve for receiving the brake cylinder pressure output from the second port of the relay valve, wherein the pilot valve is moveable to selectively couple the brake cylinder pressure output to the brake cylinder pressure outlet of the pneumatic control valve. The electronically controlled pneumatic overlay may include a solenoid valve that is moveable in response to an electrical signal to selectively connect a source of brake pipe pressure to the pilot valve. An apply/release circuit comprising a pair of solenoid valves may be coupled to a relay pilot of the relay valve to selectively move the relay valve between the first, second, and third positions. One of the solenoid valves can selectively couple a second source of reservoir pressure to the relay pilot and the other solenoid valve can selectively couple the relay pilot to an exhaust. If the first source of reservoir pressure comprises a source of emergency reservoir pressure and the second source of reservoir pressure comprises a source of auxiliary reservoir pressure, a check valve may be positioned between the source of auxiliary reservoir pressure and the source of emergency reservoir pressure to allow pressure to flow from the source of auxiliary reservoir pressure to the source of emergency reservoir pressure when the source of emergency reservoir pressure has a predetermined amount of pressure less than the source of auxiliary reservoir pressure.

The present invention includes a method of providing for electronically controlled pneumatic brakes in a conventional pneumatic braking system having a brake cylinder pressure outlet by operating a relay valve having a first port coupled to a source of reservoir pressure, a second port for providing a brake cylinder pressure output, and an exhaust, wherein the relay valve is movable between a first position where the second port is connected to the exhaust, a second position where the first port, the second port, and the exhaust are isolated from each other, and a third position where the first port is connected to the second port so that the source of reservoir pressure provides the brake cylinder pressure output, and then coupling the second port of the relay valve to the brake cylinder pressure outlet using a pilot valve that is moveable in response to pressure at a pilot between a first position where the second port of the relay valve is coupled to the brake cylinder pressure outlet and a second position where second port of the relay valve is isolated the brake cylinder pressure outlet. The step of coupling the second port of the relay valve to the brake cylinder can comprise piloting the pilot valve with a solenoid valve that can selectively couple a source of brake pipe pressure to the pilot of the pilot valve. The step of operating the relay valve can comprise using an apply/release circuit coupled to a relay pilot of the relay valve to selectively move the relay valve between the first, second, and third positions, where the apply/release circuit is a pair of solenoid valves that can selectively couple the relay pilot to a source of reservoir pressure or an exhaust.

BRIEF DESCRIPTION OF THE SEVERAL VIEWS OF THE DRAWING(S)

Figure 2:
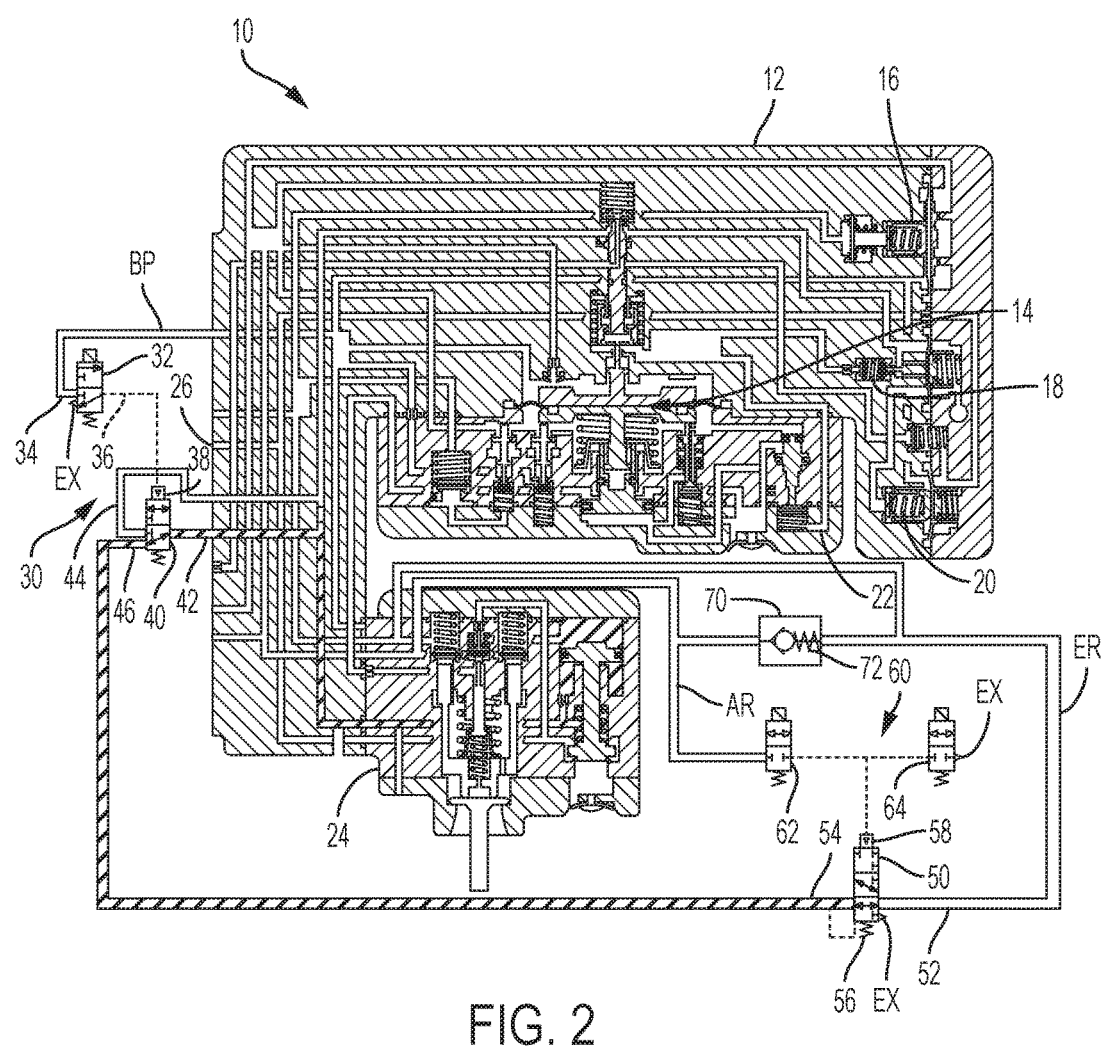

The present invention will be more fully understood and appreciated by reading the following Detailed Description in conjunction with the accompanying drawings, in which:

FIG. 1 is a schematic of an electronically controlled pneumatic overlay control valve coupled to a conventional pneumatic control valve in a conventional mode according to the present invention; and FIG. 2 is a schematic of an electronically controlled pneumatic overlay control valve coupled to a conventional pneumatic control valve in an electronically controlled mode according to the present invention.

DETAILED DESCRIPTION OF THE INVENTION

Referring to the figures, wherein like numerals refer to like parts throughout, there is seen in FIGS. 1 and 2 an electronically controlled pneumatic (ECP) overlay control valve 10 according to the present invention. Overlay control valve 10 incorporates a conventional pneumatic control valve 12, shown in FIGS. 1 and 2 as having, among other things, a main service piston 14, a service accelerated release valve 16, a quick service limiting valve 18, an emergency release AR reduction valve 20, a quick service valve 22, and a release valve 24 along with associated conduits. For example, pneumatic control valve 12 may comprise a DB-60 control valve available from New York Air Brake, LLC of Watertown, N.Y. or any comparable control valve. As is understood in the art, control valve 10 includes, among other things, a brake cylinder pressure outlet 26 that is in communication with a brake cylinder (not shown) via a conventional pipe bracket and piping to control the pressurization and venting of the brake cylinder.

Overlay control valve 10 includes a cut-in/cut-out circuit 30 coupled to pneumatic control valve 12. Cut-in/cut-out circuit 30 comprises a solenoid valve 32 coupled at an inlet 34 to a source of brake pipe (BP) pressure from pneumatic control valve 12. Electronic piloting of solenoid valve 32 can move solenoid valve 32 between a first position, where inlet 34 is coupled to outlet 36 and a second position, where outlet 36 is coupled to exhaust EX. Outlet 36 of solenoid valve 32 is coupled to the pilot 38 of a pilot valve 40 and thus controls the operation of pilot valve 40 in response to, in the example of FIGS. 1 and 2, a change in brake pipe pressure. Brake pipe pressure has been selected for illustration of the control of pilot valve 40 so that in the event of an emergency venting of the brake pipe, pilot 38 of pilot valve 40 will automatically return to the first position and switch overlay 10 into the pneumatic mode. It should be recognized that a different source of pressure may be used to control pilot valve 40 depending on the desired operation of control valve 10 in different circumstances.

Pilot valve 40 is positioned between the brake cylinder pressure control elements of pneumatic control valve 12 and the brake cylinder pressure outlet 26 and is configured to switch the control of brake cylinder pressure between a pneumatic mode, where control valve 12 is allowed to control brake cylinder pressure pneumatically, and an electronic control mode, where brake cylinder pressure in controlled electronically. Pilot valve 40 includes a first port 42 coupled to brake cylinder pressure outlet 26 downstream of the conventional brake cylinder pressure components of control valve 12. Pilot valve 40 may be piloted between a first position where first port 42 is coupled to a second port 44 that receives BC pressure control from pneumatic control valve 12 and a second position where first port 42 is coupled to a third port 46 that receives BC pressure control from relay valve 50. Pilot valve 40 is thus driven by solenoid valve 32 to select between a fully pneumatic mode, where pneumatic control valve 12 controls BC pressure, and an EP mode, where BC pressure is controlled by the output of relay valve 50 for full ECP control. For convenience, pilot valve 40 is shown in FIGS. 1 and 2 as interrupting the flow of BC pressure between control valve 12 and release valve 24 in favor of BC pressure provided under electronic control by relay valve 50. It should be recognized that pilot valve 40 may be positioned in any location between control valve 12 and the brake cylinder, and thus could be positioned in release valve 24, in a separate module positioned between control valve 12 and release valve 24, or virtually anywhere that is downstream of control valve 12 while upstream of brake cylinder pressure outlet 26 (or the brake cylinder).

Relay valve 50 is configured to apply and release BC pressure as demanded when overlay control valve 10 is switched into EP mode by cut-in/cut-out circuit 30. Relay valve 50 includes a first port 52 connected to a source of reservoir pressure, a second port 54 for outputting BC pressure to the brake cylinder via pilot valve 40 (when in ECP mode), and an exhaust EX. In the present example of the invention, emergency reservoir (ER) pressure is shown as the source of reservoir pressure. It should be recognized that other pressure reservoirs may be used to provide the pressure to first port 52 as long as sufficient pressure is available to provide the desired amount of BC pressure for operation of the brake cylinder. Relay valve 50 is moveable between a first position where second port 54 is connected to exhaust EX, a second position where all inputs are isolated from each other, and a third position where first port 52 pressure is connected to second port 54, thereby using the reservoir pressure to supply BC pressure. Relay valve 50 is shown as being biased via a spring 56 into the first position and pilotable via pressure at a pilot 58 into the second and third positions. An apply/release circuit 60 having a pair of solenoid valves 62 and 64 is coupled to pilot 58 to control the position of relay valve 50. The first solenoid valve 62 is arranged to pilot relay valve 50 into the third position using auxiliary reservoir (AR) pressure so that ER pressure is connected to BC pressure to pressurize the brake cylinder to apply the brakes, or the second position where all ports are isolated. Notably, AR, ER, or even BP pressure may be used for this purpose. The second solenoid valve 64 is arranged to selective exhaust pilot 58 of relay valve 50 and move relay valve 50 from the third position back into the second position to isolate all ports and bottle the brake cylinder, or into the first position so that BC pressure is exhausted, thereby releasing the brakes when in EP mode. Apply/release circuit 60 thus pilots relay valve 50 to selectively build, hold, or exhaust BC pressure when ECP overlay 10 is in EP mode.

A check valve 70 may be coupled between the source of AR pressure and the source of ER pressure allow the emergency reservoir to be replenished from the auxiliary reservoir if ER pressure falls below the cracking pressure of valve 70 as established by a spring 72. For example, if there is any fluctuations in BP pressure, pneumatic control valve 12 may be put into a non-charging state.

Cut-in/cut-out circuit 30, relay valve 50, and check valve 70 may be physically provided within manual release valve 24 of pneumatic control valve 12 to reduce the footprint of ECP overlay 10, although it should be recognized by those of skill in the art that the components could be housed externally of pneumatic control valve 12 and connected thereto via conventional couplings. For example, in FIGS. 1 and 2, ECP overlay 10 is shown coupled to pneumatic control valve 12 where pneumatic control valve 12 is typically coupled to a pipe bracket and thus could be provided in a module positioned between control valve 12 and the pipe bracket. Alternatively, ECP overlay 10 could be implemented in a module positioned between the main portion of control valve 12 and release valve 24.

What is claimed is:

1. An electronically controlled pneumatic overlay for a pneumatic control valve having a brake cylinder pressure outlet, comprising:

a relay valve having a first port coupled to a source of reservoir pressure, a second port for providing a brake cylinder pressure output, and an exhaust, wherein the relay valve is movable between a first position where the second port is connected to the exhaust, a second position where the first port, the second port, and the exhaust are isolated from each other, and a third position where the first port is connected to the second port so that the source of reservoir pressure provides the brake cylinder pressure output;

a pilot valve coupled to the relay valve for receiving the brake cylinder pressure output from the second port of the relay valve, wherein the pilot valve is moveable to selectively couple the brake cylinder pressure output to the brake cylinder pressure outlet of the pneumatic control valve;

a solenoid valve that is moveable in response to an electrical signal to selectively connect a source of brake pipe pressure to the pilot valve; and an apply/release circuit comprising a pair of solenoid valves coupled to a relay pilot of the relay valve to selectively move the relay valve between the first, second, and third positions.

2. The electronically controlled pneumatic overlay of claim 1, wherein one of the solenoid valves can selectively couple a second source of reservoir pressure to the relay pilot and the other solenoid valve can selectively couple the relay pilot to an exhaust.

3. The electronically controlled pneumatic overlay of claim 2, further comprising a third solenoid valve that is moveable in response to an electrical signal to selectively connect a source of brake pipe pressure to a pilot of the pilot valve.

4. The electronically controlled pneumatic overlay of claim 3, wherein the first source of reservoir pressure comprises a source of emergency reservoir pressure, the second source of reservoir pressure comprises a source of auxiliary reservoir pressure, and the electronically controlled pneumatic overlay further comprises a check valve positioned between the source of auxiliary reservoir pressure and the source of emergency reservoir pressure.

5. The electronically controlled pneumatic overlay of claim 4, wherein the check valve will open to allow pressure to flow from the source of auxiliary reservoir pressure to the source of emergency reservoir pressure when the source of emergency reservoir pressure has a predetermined amount of pressure less than the source of auxiliary reservoir pressure.

6. A method of providing for electronically controlled pneumatic brakes in a conventional pneumatic braking system having a brake cylinder pressure outlet, comprising the steps of operating a relay valve having a first port coupled to a source of reservoir pressure, a second port for providing a brake cylinder pressure output, and an exhaust, wherein the relay valve is movable between a first position where the second port is connected to the exhaust, a second position where the first port, the second port, and the exhaust are isolated from each other, and a third position where the first port is connected to the second port so that the source of reservoir pressure provides the brake cylinder pressure output, wherein operating the relay valve comprises using an apply/release circuit coupled to a relay pilot of the relay valve to selectively move the relay valve between the first second, and third positions by operating a pair of solenoid valves to selectively couple the relay pilot to a second source of reservoir pressure or an exhaust;

coupling the second port of the relay valve to the brake cylinder pressure outlet using a pilot valve that is moveable in response to pressure at a pilot between a first position where the second port of the relay valve is coupled to the brake cylinder pressure outlet and a second position where second port of the relay valve is isolated the brake cylinder pressure outlet, wherein coupling the second port of the relay valve to the brake cylinder pressure outlet comprises piloting the pilot valve with a solenoid valve that can selectively couple a source of pressure to the pilot of the pilot valve.

7. The method of claim 6, further comprising the step of providing a check valve between the first source of reservoir pressure and the second source of reservoir pressure if the first source of reservoir pressure is a source of emergency reservoir pressure and the second source of reservoir pressure in a source of auxiliary reservoir pressure.

8. The method of claim 7, further comprising the step of allowing pressure to flow from the source of auxiliary reservoir pressure to the source of reservoir pressure when the source of reservoir pressure has a predetermined amount of pressure less than the source of auxiliary reservoir pressure.

* * * * *